(12) United States Patent
DeCoste et al.

(10) Patent No.: US 10,610,851 B1
(45) Date of Patent: Apr. 7, 2020

(54) ENHANCEMENT OF ADSORPTION VIA POLARIZATION IN A COMPOSITE MATERIAL

(71) Applicant: Combat Capabilities Development Command, Chemical Biological Center, APG, MD (US)

(72) Inventors: Jared B DeCoste, Bel Air, MD (US); Trenton M Tovar, Parkville, MD (US); Ivan O Iordanov, Baltimore, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/574,294

(22) Filed: Sep. 18, 2019

Related U.S. Application Data

(62) Division of application No. 15/385,300, filed on Dec. 20, 2016, now Pat. No. 10,427,134.

(51) Int. Cl.
*B01D 53/02* (2006.01)
*B01J 20/28* (2006.01)
(Continued)

(52) U.S. Cl.
CPC ......... *B01J 20/28011* (2013.01); *B01D 53/04* (2013.01); *B01J 20/103* (2013.01); *B01J 20/18* (2013.01); *B01J 20/20* (2013.01); *B01J 20/226* (2013.01); *B01J 20/26* (2013.01); *B01D 2253/202* (2013.01); *B01D 2253/204* (2013.01);
(Continued)

(58) Field of Classification Search
CPC .... B01J 20/28011; B01J 20/103; B01J 20/18; B01J 20/20; B01J 20/226; B01J 20/26; B01D 53/04; B01D 2253/202; B01D 2253/204; B01D 2253/25; B01D 2257/104
See application file for complete search history.

(56) References Cited

U.S. PATENT DOCUMENTS

| 5,112,677 A * | 5/1992 | Tani ................... B01D 39/1623 29/886 |
| 2002/0066368 A1* | 6/2002 | Zornes ................ B01J 20/3441 96/1 |

(Continued)

*Primary Examiner* — Christopher P Jones
(74) *Attorney, Agent, or Firm* — Ulysses John Biffoni

(57) ABSTRACT

A composite adsorbent material includes a component that creates a localized electric field and a porous material where adsorption occurs, wherein the localized electric field extends into the porous material. The localized electric field created by the component controls adsorption properties of the porous material. The porous material may be microporous. The component may include ferroelectric material including a β-phase of polyvinylidene fluoride (PVDF), and wherein the porous material may include any of zeolites, silicas, activated carbons, covalent organic frameworks (COFs), polymers of intrinsic microporosity (PIMs), and metal-organic frameworks (MOFs). The MOFs may include any of HKUST-1, UiO-66, and UiO-66-NH$_2$. The β-phase of PVDF and the HKUST-1 may be electrospun together. The β-phase of PVDF includes aligned polymer chains that create the localized electric field extending within the porous material. The localized electric field enhances adsorption of an adsorbate, particularly a non-polar adsorbate such as oxygen or carbon dioxide, to the porous material.

10 Claims, 6 Drawing Sheets

(51) Int. Cl.
  *B01D 53/04* (2006.01)
  *B01J 20/22* (2006.01)
  *B01J 20/26* (2006.01)
  *B01J 20/18* (2006.01)
  *B01J 20/20* (2006.01)
  *B01J 20/10* (2006.01)
(52) U.S. Cl.
  CPC .... *B01D 2253/25* (2013.01); *B01D 2257/104* (2013.01)

(56) References Cited

U.S. PATENT DOCUMENTS

| | | | |
|---|---|---|---|
| 2003/0154865 A1* | 8/2003 | Zornes | B01D 53/02 96/143 |
| 2004/0060864 A1* | 4/2004 | Shepodd | B01J 20/26 210/635 |
| 2010/0155335 A1* | 6/2010 | Taboada-Serrano | B01J 20/0229 210/663 |
| 2010/0319534 A1* | 12/2010 | Currier | B01D 53/04 95/45 |
| 2012/0040471 A1* | 2/2012 | Chen | C07C 7/12 436/172 |
| 2013/0309927 A1* | 11/2013 | Jangbarwala | B01D 53/28 442/119 |
| 2015/0073164 A1* | 3/2015 | Nomura | C07C 45/38 556/115 |
| 2015/0306547 A1* | 10/2015 | Unnikrishnan | B01D 67/0034 96/12 |
| 2016/0201853 A1* | 7/2016 | Weickert | F17C 11/007 206/0.7 |

* cited by examiner

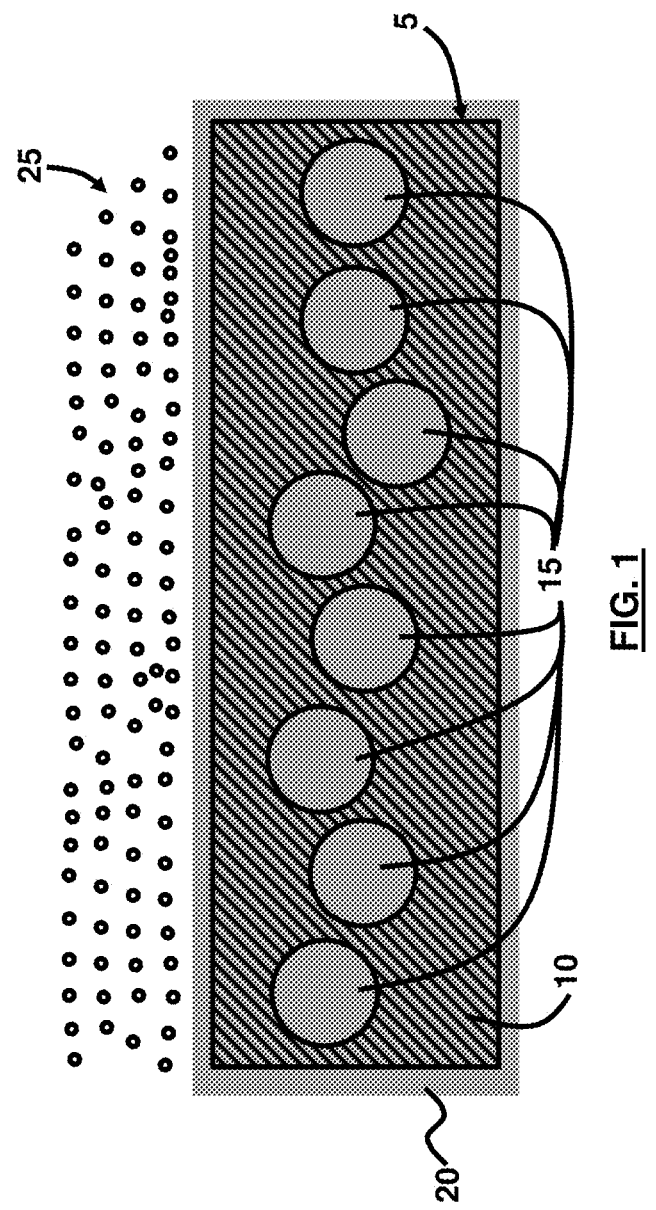

ENHANCEMENT OF ADSORPTION VIA POLARIZATION IN A COMPOSITE MATERIAL

CROSS-REFERENCE TO RELATED APPLICATIONS

This application is a divisional of U.S. application Ser. No. 15/385,300 filed on Dec. 20, 2016, now U.S. Pat. No. 10,427,134 which is commonly assigned.

GOVERNMENT INTEREST

The embodiments herein may be manufactured, used, and/or licensed by or for the United States Government without the payment of royalties thereon.

BACKGROUND

Technical Field

The embodiments herein generally relate to adsorption techniques, and more particularly to adsorption in composite materials.

Description of the Related Art

Generally, adsorption involves the attraction of molecules (adsorbate) to a surface (adsorbent). Adsorption has been known to be governed by three main factors: (1) the concentration of active adsorbent sites; (2) the strength of the adsorbent-adsorbate interaction; and (3) the strength of interactions between independent adsorbate molecules. However, without an external force on the surface material, adsorption is limited by these factors. For polar adsorbates, or those that can form chemical bonds with the adsorbent, adsorption can, in many cases, be quite great, even at low pressures; however, for non-polar gases, such as oxygen, carbon dioxide, or methane, adsorption is typically quite limited as there is minimal attraction between the adsorbent and adsorbate.

SUMMARY

In view of the foregoing, an embodiment herein provides a composite material comprising a component that creates a localized electric field; and a porous material where adsorption occurs, wherein the localized electric field extends into the porous material. The localized electric field created by the component controls adsorption properties of the porous material. The porous material may be microporous. The component may comprise ferroelectric material comprising a β-phase of polyvinylidene fluoride (PVDF), wherein the porous material may comprise any of zeolites, silicas, activated carbons, covalent organic frameworks (COFs), polymers of intrinsic microporosity (PIMs), and metal-organic frameworks (MOFs). The MOFs may comprise any of HKUST-1, UiO-66, and UiO-66-$NH_2$. The β-phase of PVDF and the HKUST-1 may be electrospun together. The β-phase of PVDF comprises aligned polymer chains, wherein the aligned polymer chains create the localized electric field extending within the porous material. The localized electric field may enhance an adsorption of an adsorbate to the porous material. The localized electric field may enhance an adsorption of a non-polar adsorbate to the porous material. The localized electric field may enhance an adsorption of oxygen to the porous material.

Another embodiment provides a method of adsorption comprising providing a composite material comprising a component that creates a localized electric field throughout the composite material; and a porous material where adsorption occurs, wherein the localized electric field extends into the porous material; and providing an adsorbate for adsorption by the composite material, wherein the localized electric field created by the component controls adsorption properties of the porous material. The porous material may be microporous. The component may comprise ferroelectric material comprising a β-phase of PVDF. The porous material may comprise any of zeolites, silicas activated carbons, COFs, PIMs, and MOFs. The MOFs may comprise any of HKUST-1, UiO-66, and UiO-66-$NH_2$. The method may further comprise electrospinning the β-phase of PVDF and the HKUST-1 together. The β-phase of PVDF comprises aligned polymer chains, wherein the aligned polymer chains create the localized electric field extending within the porous material. The localized electric field may enhance an adsorption of an adsorbate to the porous material. The localized electric field may enhance an adsorption of a non-polar adsorbate to the porous material. The localized electric field may enhance an adsorption of oxygen to the porous material.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a cross-sectional side view of a ferroelectric-adsorbent composite with an aligned electric field according to the embodiments herein;

DETAILED DESCRIPTION

Figure 2A:
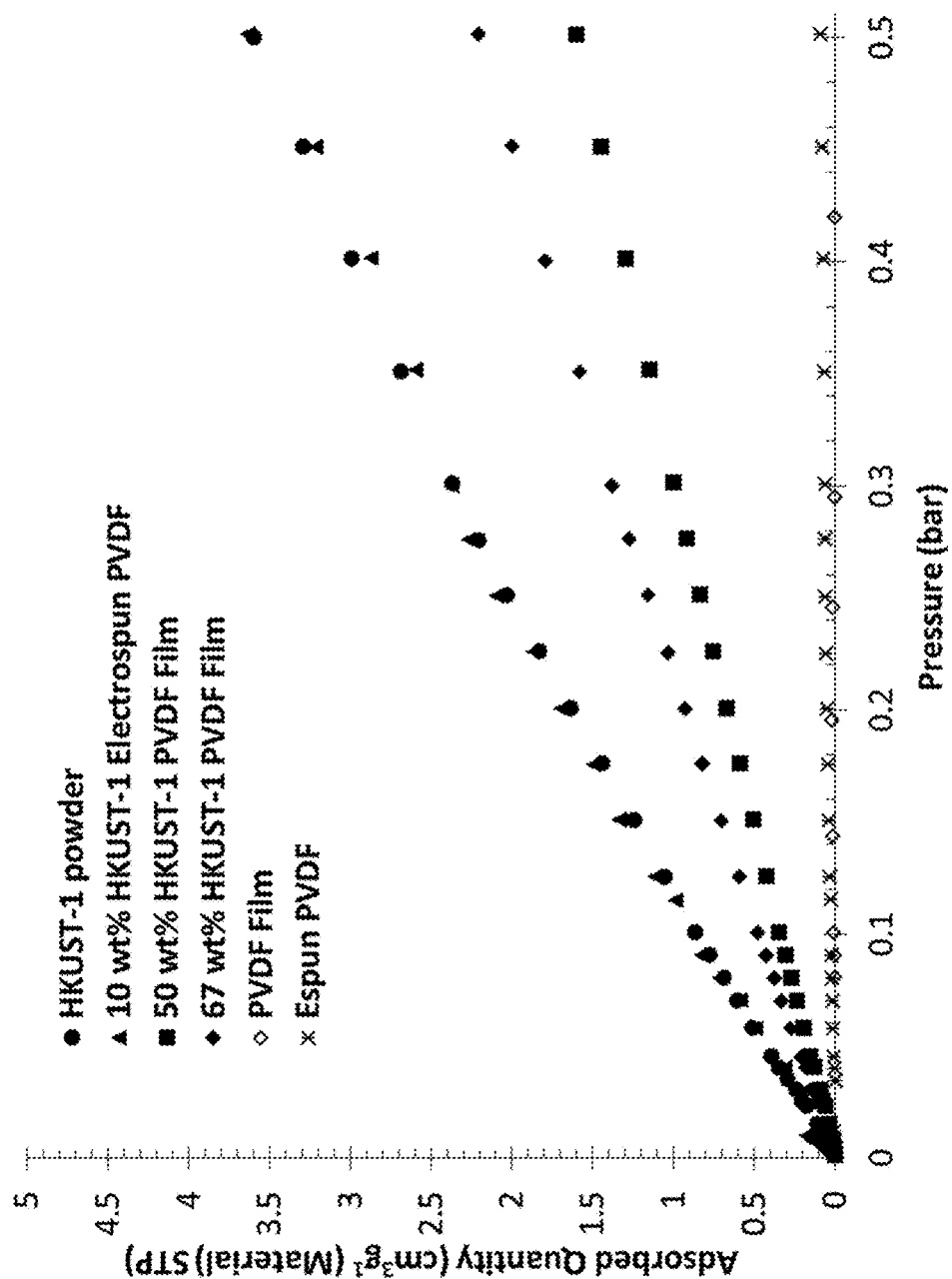
FIG. 2A is a graphical representation illustrating oxygen uptake isotherms for various HKUST-1-PVDF composites according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique to utilize the ferroelectric capability of one material in a composite to increase the uptake of an adsorbate of interest by a porous material in the composite. Referring now to the drawings, and more particularly to FIGS. 1 through 5, where similar reference characters denote corresponding features consistently throughout the figures, there are shown preferred embodiments.

FIG. 1 illustrates a composite material 5 comprising a component 10 that creates a localized electric field 20 throughout the composite material 5; and a porous material 15 where adsorption of an adsorbate (e.g., molecule) 25 occurs, wherein the localized electric field 20 extends into the porous material 15. In general, the composite material 5 has two characteristics that may either come from one or multiple components 10, 15: (1) the material 5 exhibits a localized electric field 20 arising from a component 10 such as ferroelectric material comprising β-phase of polyvinylidene fluoride (PVDF); and (2) the electric field 20 extends into the porous material 15 where adsorption occurs. In the example shown in FIG. 1, the electric field 20 is locally aligned by the component 10. The electric field 20, in turn, affects the sorption properties of the adsorbent (e.g., porous material 15).

Figure 2B:
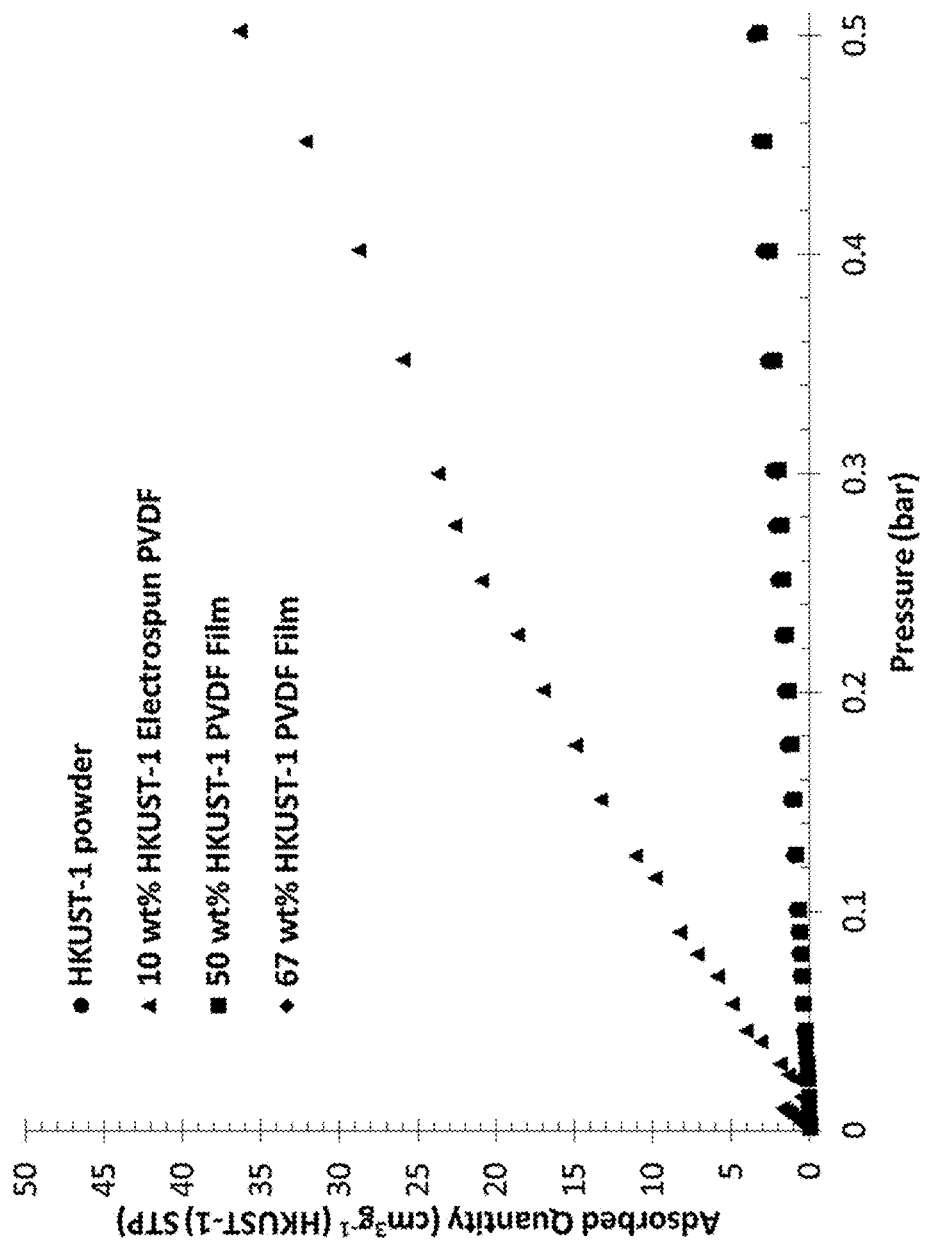
FIG. 2B is a graphical representation illustrating oxygen uptake isotherms for various HKUST-1-PVDF composites scaled for adsorbent content according to the embodiments herein.

Sorbents with micropores (i.e., pores less than two nanometers in diameter), such as zeolites, activated carbons, and metal-organic frameworks (MOFs), are quite effective for adsorption of small molecules. For instance, the MOF known as HKUST-1 (Hong Kong University of Science and Technology) is particularly effective at the sorption of oxygen. When a composite of HKUST-1 and PVDF are electrospun together in a composite material 5, there is a nearly ten-fold increase in the sorption capacity of the adsorbent at 0.5 bar as shown in FIG. 2B. In fact, the composite material 5, which only has 10% adsorbent, exhibits nearly the same capacity as the pure powder, meaning that much less actual adsorbent is needed to be utilized in order to achieve similar oxygen uptake capacities under these conditions as shown in FIG. 2A.

Figure 3:
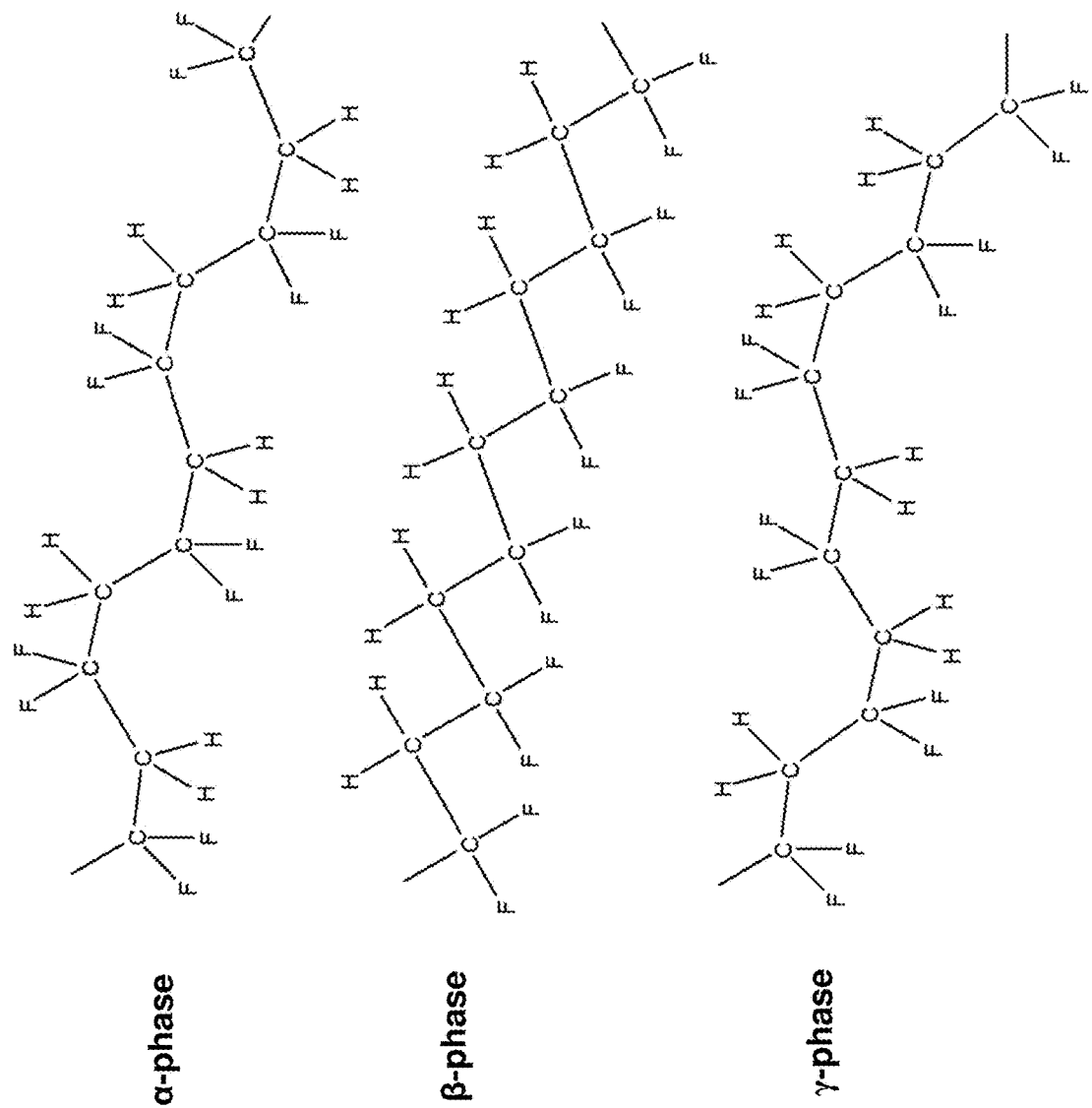
FIG. 3 is a schematic diagram illustrating the α-(trans-gauche-trans-gauche), β-(trans-trans-trans-trans), and γ-(trans-trans-trans-gauche) phases of PVDF according to the embodiments herein.

The HKUST-1 PVDF films do not have the same enhancement in oxygen uptake as the electrospun PVDF fibers. The principal difference between these two materials is the phase in which the PVDF polymer exhibits itself. While the HKUST-1 PVDF films are primarily in the γ-phase, the electrospun PVDF composite is primarily in the β-phase, as confirmed through infrared spectroscopy. PVDF exists in five distinct phases, the three most common are shown in FIG. 3. In the α-phase, the chain conformation alternates trans and gauche for each carbon atom. In the β-phase, each carbon atom is in the trans configuration. In the γ-phase, a trans-trans-trans-gauche pattern is observed. Of these phases, only the β-phase exhibits ferroelectric properties, meaning that the polymer is polarized due to the electronegative fluorine atoms being aligned on one side of the carbon chain, while the more electropositive hydrogen atoms are aligned on the other.

Figure 4B:
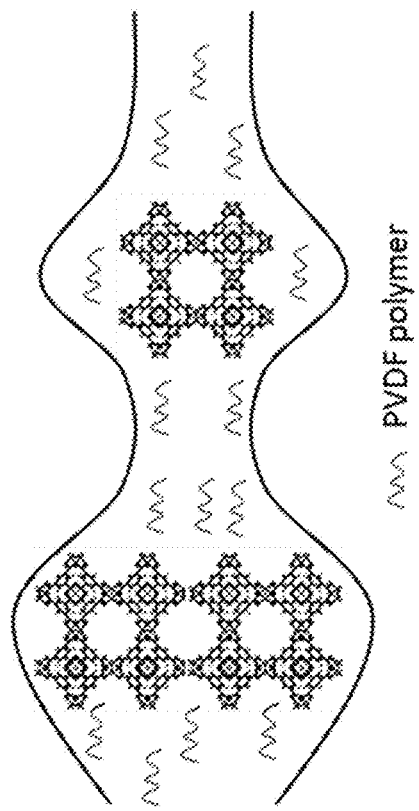
FIG. 4B is a schematic diagram illustrating a PVDF-MOF nanofiber showing the alignment of individual polymer molecules according to the embodiments herein.
Figure 4A:
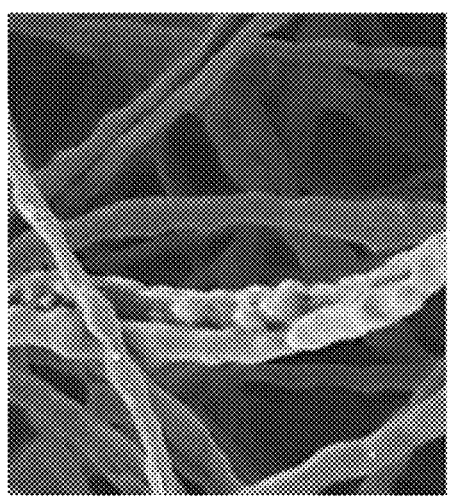
FIG. 4A is a scanning electron micrograph (SEM) image of PVDF-MOF electrospun phases according to the embodiments herein.
Figure 4C:
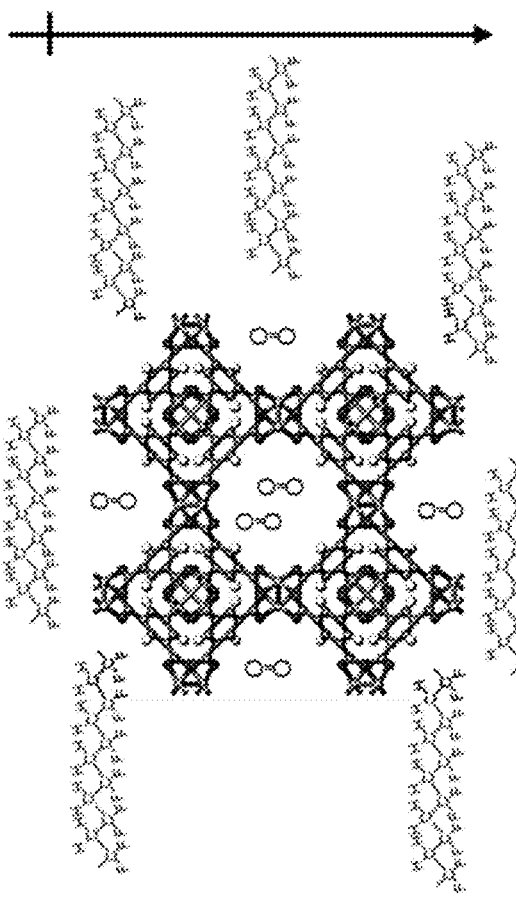
FIG. 4C is a schematic diagram illustrating the alignment of the dipoles to the adsorbate (oxygen) with the polymer fibers to enhance the adsorption according to the embodiments herein.

Within the individual crystallites of the β-phase of PVDF, the polymer chains are aligned, creating a localized electric field. Individual polymer chains are also potentially small enough to penetrate the pores of the MOF. The electric field can extend into the pores of the MOF, or other microporous material, enhancing its adsorption of gases, in particular, those with otherwise weak attractive forces toward the material as shown in FIGS. 4A through 4C.

Figure 5:
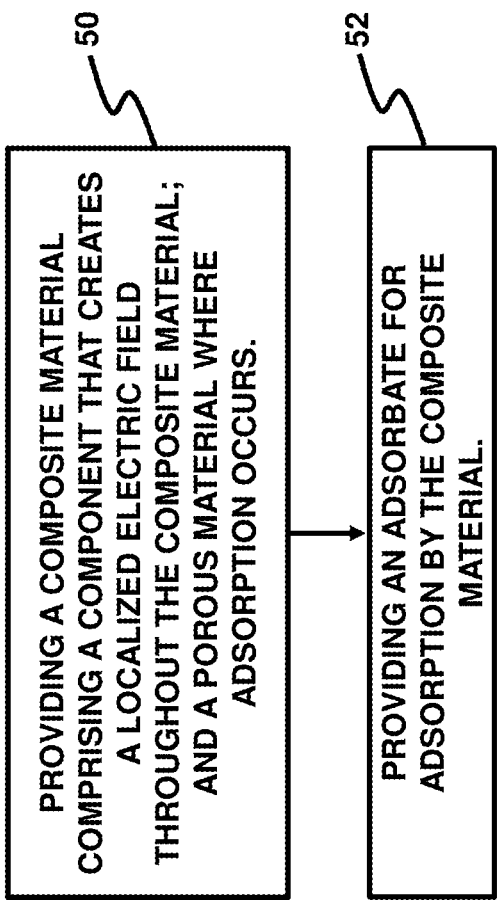
FIG. 5 is a flow diagram illustrating a method according to an embodiment herein.

FIG. 5, with reference to FIGS. 1 through 4C, is a flow diagram illustrating a method of adsorption comprising providing (50) a composite material 5 comprising a component 10 that creates a localized electric field 20 throughout the composite material 5; and a porous material 15 where adsorption occurs, wherein the localized electric field 20 extends into the porous material 15; and providing (52) an adsorbate 25 for adsorption by the composite material 5, wherein the localized electric field 20 created by the component 10 controls adsorption properties of the porous material 15. The porous material 15 the porous materials may be comprised of micro- (less than 2 nm) meso- (2-50 nm) or macro (greater than 50 nm) pores. In one embodiment, the porous material 15 may be microporous. The component 10 may comprise ferroelectric material comprising a β-phase of PVDF. The porous material 15 may comprise any of zeolites, silicas activated carbons, COFs, PIMs, and MOFs. The MOFs may comprise any of HKUST-1, UiO-66, and UiO-66-$NH_2$. The method may further comprise electrospinning the β-phase of PVDF and the HKUST-1 together. The β-phase of PVDF comprises aligned polymer chains, wherein the aligned polymer chains create the localized electric field 20 extending within the porous material 15. The localized electric field 20 enhances an adsorption of an adsorbate, a non-polar adsorbate, or oxygen to the porous material 15.

Compared to the conventional adsorption technology of using powders or pellets for adsorption, the composite material 5 enhances the adsorption, specifically for oxygen, significantly, and the composite material 5 provides a pliable engineered form to the adsorbate, which can more easily be utilized in a device such as gas cylinders, oxygen separation membranes, and rebreather systems.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of adsorption, comprising:
   providing a composite adsorbent material comprising a
      component that creates a localized electric field throughout said composite material and a porous material where adsorption occurs, wherein said component that creates a localized electric field comprises ferroelectric material comprising a β-phase of polyvinylidene fluoride (PVDF) and wherein said localized electric field extends into said porous material; and providing an adsorbate for adsorption by said composite adsorbent material, wherein said localized electric field created by said component controls adsorption properties of said porous material.

2. The method of claim 1, wherein said porous material is microporous.

3. The method of claim 1, wherein said porous material comprises any of zeolites, silicas, activated carbons, covalent organic frameworks (COFs), polymers of intrinsic microporosity (PIMs), and metal-organic frameworks (MOFs).

4. The method of claim 3, wherein said MOFs comprise any of HKUST-1, UiO-66, and UiO-66-$NH_2$.

5. The method of claim 4, further comprising electrospinning said β-phase of PVDF and said HKUST-1 together.

6. The method of claim 1, wherein said β-phase of PVDF comprises aligned polymer chains.

7. The method of claim 6, wherein said aligned polymer chains create said localized electric field extending within said porous material.

8. The method of claim 1, wherein said localized electric field enhances an adsorption of an adsorbate to said porous material.

9. The method of claim 1, wherein said localized electric field enhances an adsorption of a non-polar adsorbate to said porous material.

10. The method of claim 1, wherein said localized electric field enhances an adsorption of oxygen to said porous material.

* * * * *